(12) United States Patent
Suzuki

(10) Patent No.: US 9,406,060 B2
(45) Date of Patent: *Aug. 2, 2016

(54) RECEIPT DATA PROCESSING DEVICE AND METHOD FOR PROCESSING RECEIPT DATA

(71) Applicant: TOSHIBA TEC KABUSHIKI KAISHA, Tokyo (JP)

(72) Inventor: Hiromasa Suzuki, Numazu Shizuoka (JP)

(73) Assignee: Toshiba TEC Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/793,204

(22) Filed: Jul. 7, 2015

(65) Prior Publication Data
US 2015/0310415 A1  Oct. 29, 2015

Related U.S. Application Data

(62) Division of application No. 14/249,241, filed on Apr. 9, 2014, now Pat. No. 9,105,058.

(30) Foreign Application Priority Data

Apr. 10, 2013 (JP) .................................. 2013-082514

(51) Int. Cl.
| | |
|---|---|
| G06F 3/12 | (2006.01) |
| G06Q 20/20 | (2012.01) |
| G06Q 30/04 | (2012.01) |
| G06Q 20/04 | (2012.01) |
| G07G 5/00 | (2006.01) |
| G06K 15/00 | (2006.01) |

(52) U.S. Cl.
CPC .......... *G06Q 20/209* (2013.01); *G06Q 20/0453* (2013.01); *G06Q 20/20* (2013.01); *G06Q 30/04* (2013.01); *G07G 5/00* (2013.01)

(58) Field of Classification Search
None
See application file for complete search history.

(56) References Cited

U.S. PATENT DOCUMENTS

| | | | |
|---|---|---|---|
| 9,105,058 B2* | 8/2015 | Suzuki | ............... G06Q 20/0453 |
| 2005/0242178 A1 | 11/2005 | Minowa | |

(Continued)

FOREIGN PATENT DOCUMENTS

| | | |
|---|---|---|
| JP | 2008-242675 A | 10/2008 |
| JP | 2011-090375 A | 5/2011 |

(Continued)

OTHER PUBLICATIONS

Japanese Office Action dated Jan. 6, 2015, filed in Japanese counterpart Application No. 2013-082514, 6 pages (with translation).

*Primary Examiner* — Dov Popovici
(74) *Attorney, Agent, or Firm* — Patterson & Sheridan, LLP

(57) ABSTRACT

According to one embodiment, a receipt data processing device includes a data generating section, an output section, and a converting section. The data generating section is configured to generate receipt data of a first data format including information about an item purchased by a customer. The output section is configured to output the receipt data to at least one of a printing device and an external device that is different from the printing device. The converting section is configured to convert a data format of the receipt data from the first data format to a second data format that is different from the first data format when the receipt data is output to the external device.

20 Claims, 11 Drawing Sheets

(56) References Cited

U.S. PATENT DOCUMENTS

2012/0078740 A1 3/2012 Watanabe
2013/0159090 A1 6/2013 Boal

FOREIGN PATENT DOCUMENTS

| JP | 2012027633 A | 2/2012 |
| JP | 2009-042931 A | 7/2015 |

* cited by examiner

POS TERMINAL — 1
- RECEIPT DATA GENERATION UNIT — 111
- RECEIPT DATA OUTPUT UNIT — 112

- D3 — ○○○ MART
- D4 — STORE AT ○○○
- D5 — (XXXX)-XXXX-XXXX
- D6 — XXXX, IZUNOKUNI-SHI, SHIZUOKA PREFECTURE
- D7 — NOVEMBER 22 (THU), 2012, 10:30
- D8 — TRANSACTION NO. 0001
- D9 — REGISTER NO. 0001
- D10 — PERSON IN CHARGE: SUZUKI
- D2 — MEMBER NUMBER: 000000001

D1:
```
MERCHANDISE 1      ¥100
MERCHANDISE 2      ¥200
MERCHANDISE 3      ¥300

TOTAL AMOUNT       ¥600

DEPOSIT AMOUNT     ¥1000
CHANGE AMOUNT      ¥400
```

FIG. 9

```
<?xml version="1.0" ?>
<!DOCTYPE XXX [
<!ELEMENT XXX (AAA)>
<!ELEMENT AAA (#PCDATA)>
]>
```

D3 — `<storecode> ooo MART </storecode>`
D4 — `<blanchcode> STORE AT ooo </blanchcode>`
D5 — `<TEL>(XXXX)-XXXX-XXXX</TEL>`
D6 — `<address> XXXX, IZUNOKUNI-SHI, SHIZUOKA PREFECTURE </address>`
D7 — `<date> NOVEMBER 22 (THU), 2012, 10:30 </date>`
D8 — `<receiptnumber>0001</receiptnumber>`
D9 — `<registernumber>0001</registernumber>`
D10 — `<name> SUZUKI </name>`

D2 — `<membercode>000000001</membercode>`

D1 — 
```
<meisai>
<meisai1name> MERCHANDISE 1 </meisai1name>
<meisai1price>100</meisai1price>
<meisai2name> MERCHANDISE 2 </meisai1name>
<meisai2price>200</meisai1price>
<meisai3name> MERCHANDISE 3 </meisai1name>
<meisai3price>300</meisai1price>
</meisai>
<total>600</total>
<deposit>1000</deposit>
<change>400</change>
```

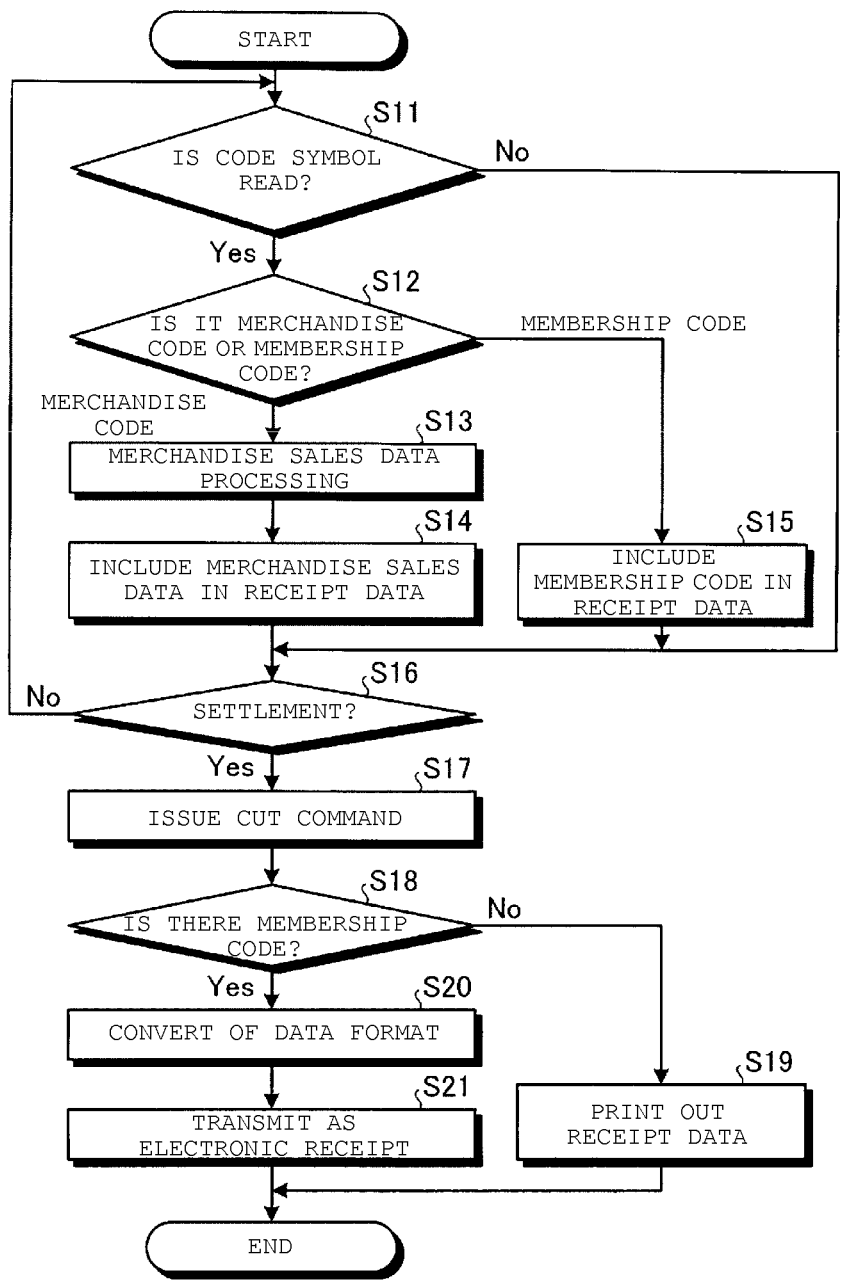

RECEIPT DATA PROCESSING DEVICE AND METHOD FOR PROCESSING RECEIPT DATA

CROSS-REFERENCE TO RELATED APPLICATION

This application is a division of U.S. patent application Ser. No. 14/249,241, filed on Apr. 9, 2014, which is based upon and claims the benefit of priority from Japanese Patent Application No. 2013-082514, filed Apr. 10, 2013, the entire contents of each of which are incorporated herein by reference.

FIELD

Embodiments described herein relate generally to a receipt data processing device and a method for processing the receipt data.

BACKGROUND

In the related art, a technology of an electronic receipt is known. An electronic receipt is electronically delivered to a mobile terminal, or the like owned by a customer from a store when a purchase transaction of merchandise is completed. One system of the related art issues either a conventional paper receipt or the electronic receipt based on the customer's selection of whether the receipt is output physically or electronically.

DESCRIPTION OF THE DRAWINGS

FIG. 9 is a diagram which schematically illustrates an example of structured receipt data.

FIG. 10 is a flowchart of processing of the electronic receipt carried out by the POS terminal.

DETAILED DESCRIPTION

In general, according to one embodiment, a receipt data processing device includes a data generating section, an output section, and a converting section. The data generating section is configured to generate receipt data of a first data format including information about an item purchased by a customer. The output section is configured to output the receipt data to at least one of a printing device and an external device that is different from the printing device. The converting section is configured to convert a data format of the receipt data from the first data format to a second data format that is different from the first data format when the receipt data is output to the external device.

Hereinafter, one embodiment will be described based on drawings.

Figure 1:
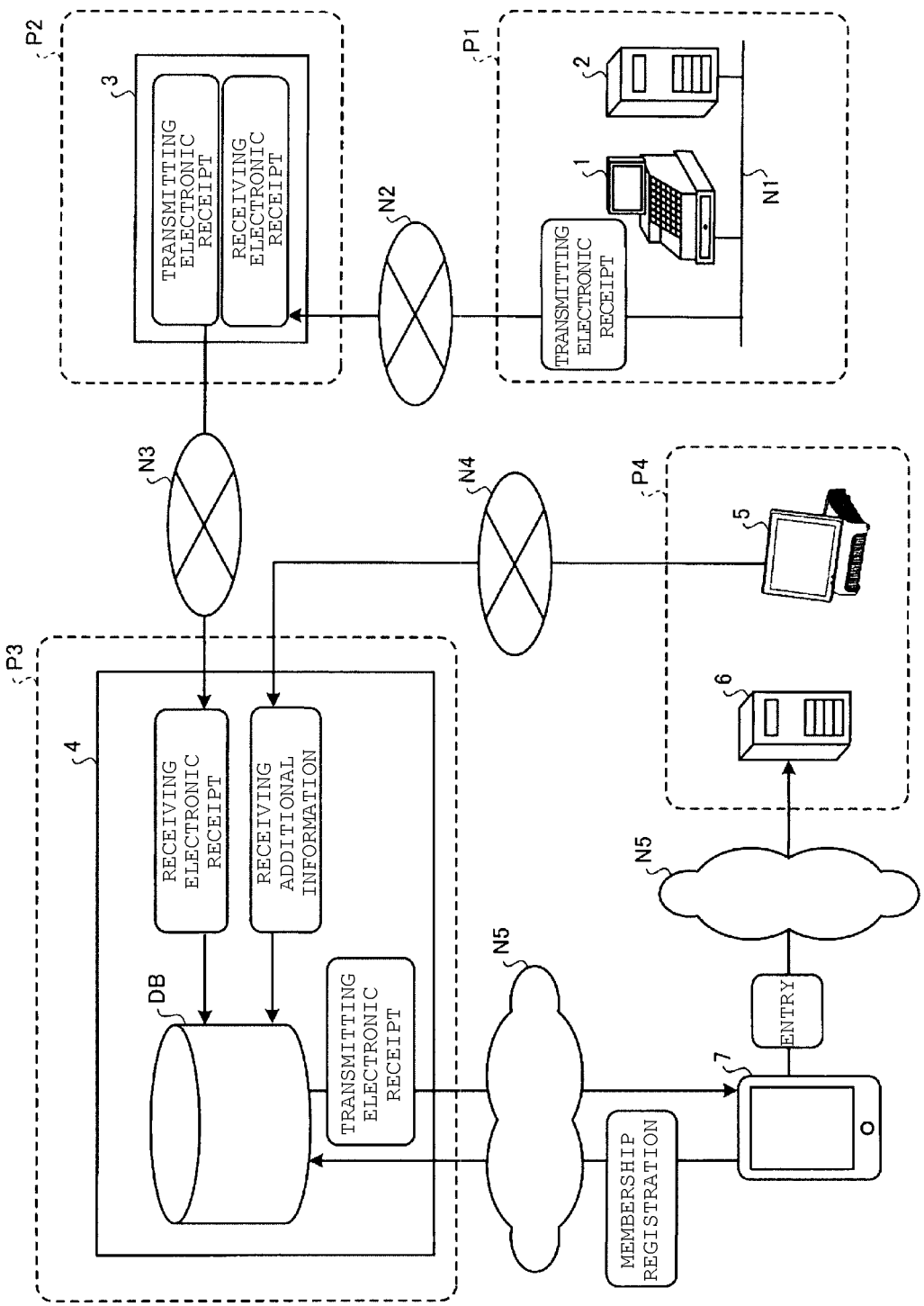
FIG. 1 is a configuration diagram of an overall configuration of an electronic receipt system according to an embodiment.

FIG. 1 illustrates the entire configuration of an electronic receipt system according to the embodiment. As illustrated in FIG. 1, the electronic receipt system includes a Point of Sales (POS) terminal 1, a store server 2, an electronic receipt server 3, an electronic receipt managing server 4, a promotion setting terminal 5, a promotion managing server 6, and a mobile terminal 7.

The POS terminal 1 and the store server 2 are provided in a store P1. The POS terminal 1 and the store server 2 are connected to be able to communicate through an in-store network N1 such as a Local Area Network (LAN). In addition, the POS terminal 1 and the store server 2 may be connected to a network N2 through which the store P1 and a head office P2 are connected with each other, with a network device (not shown) such as a router which is connected to the in-store network N1. Here, the network N2 is, for example, an exclusive line such as the Internet, or a Virtual Private Network (VPN).

The POS terminal 1 is a merchandise sales data processing device which executes merchandise sales data processing. The POS terminal 1 generates receipt data including transaction contents of merchandise to be settled, and a paper receipt corresponding to the receipt data is printed by a printer 13, which will be described below. In addition, the POS terminal 1 outputs (transmits) an electronic receipt of which data format is converted from that of the receipt data to the electronic receipt server 3 through the network N2. A method of transmitting the electronic receipt is not particularly limited, and the transmission may be performed using a general-purpose protocol such as HTTP, HTTPS, or the like. In addition, the number of POS terminal 1 which is provided in the store P1 is not particularly limited, and a plurality of the terminals may be used.

The store server 2 generally performs a management of data such as the merchandise sales data generated by the POS terminal 1. For example, the store server 2 stores and manages merchandise sales data which is generated through the merchandise sales data processing performed by the POS terminal 1, or stores and manages a merchandise data sales file, or the like, which is used in the merchandise sales data processing.

In addition, the number of POS terminal 1 arranged in the store P1 is not particularly limited, and a plurality of the terminals may be used. In addition, according to the embodiment, a configuration in which the POS terminal 1 converts the data format of the receipt data is described; however, it is not limited to this. The receipt data which is generated by the POS terminal 1 may be output to the store server 2, or a conversion device (not shown), and the data format of the receipt data may be converted there.

The electronic receipt server 3 is provided in the head office P2 of a company which manages one or more stores or chain stores (hereinafter, referred to as stores), and functions as a receipt managing server for a company which manages receipt data of the company. The electronic receipt server 3 has a function of, for example, sales management, sales analysis, inventory control, or the like of the company.

In addition, the electronic receipt server 3 receives the electronic receipt which is transmitted from the POS terminal 1 through the network N2. In addition, the electronic receipt server 3 transmits the received electronic receipt to the electronic receipt managing server 4 through a network N3 through which the head office P2 and an electronic receipt center P3 are connected.

Here, the network N3 is, for example, an exclusive line such as the Internet, a VPN, or the like. In addition, a method of transmitting the electronic receipt is not particularly limited, and the transmission may be performed using a general-purpose protocol such as HTTP, HTTPS, or the like.

The electronic receipt managing server 4 is provided in the electronic receipt center P3. The electronic receipt center P3 is, for example, a trusted third party that is different from the company which manages the receipt data in the electronic receipt server 3. In addition, the trusted third party, or the like, may also manage the electronic receipt server 3.

The electronic receipt managing server 4 functions as a customer receipt managing server which collectively manages receipt data of various companies each of which manage stores. The electronic receipt managing server 4 stores member data such as a name of each customer (member) who performed a membership registration according to a procedure, which will be described below, a membership code, or destination information (for example, email address) of the mobile terminal 7 which is a destination of the electronic receipt, or the like, in a member master of a database DB, and manages thereof. In addition, a member managing server, or the like, which stores the member data, and manages thereof may be provided separately from the electronic receipt managing server 4.

In addition, the electronic receipt managing server 4 receives the electronic receipt which is transmitted from the electronic receipt server 3 through the network N3, stores the electronic receipt in an electronic receipt managing region 43a which is maintained in the database DB, and will be described below, and manages the electronic receipt. More specifically, the electronic receipt includes elements such as membership codes in addition to transaction contents of merchandise (merchandise sales data), and is managed by being correlated with the member data of a corresponding member.

In addition, the electronic receipt managing server 4 receives additional information such as campaign information related to a campaign of a specific merchandise from the promotion setting terminal 5 which is connected through a network N4 which will be described below, stores the additional information in an additional information managing region 43b which is maintained in the database DB, and will be described below, and manages the information. More specifically, the additional information is managed by being correlated with elements corresponding to a predetermined condition among elements included in the electronic receipt stored in the database DB.

In addition, when storing the electronic receipt in the database DB, the electronic receipt managing server 4 specifies a destination (mobile terminal 7) by referring to destination information which is correlated with a membership code of the electronic receipt. In addition, the electronic receipt managing server 4 transmits the electronic receipt which is stored in the database DB to the destination through a network N5 which will be described below. In addition, when additional information is correlated with the electronic receipt, the additional information is also transmitted to the destination.

In addition, when receiving an inquiry of an electronic receipt for designating a membership code from the mobile terminal 7 which is connected through the network N5 which will be described below, the electronic receipt managing server 4 extracts an electronic receipt corresponding to the membership code from the database DB, and transmits the electronic receipt to the mobile terminal 7. In addition, when additional information is correlated with the electronic receipt, the additional information is also transmitted to the mobile terminal 7 which made the inquiry.

The promotion setting terminal 5 and the promotion managing server 6 are provided at a consumer goods manufacturer P4, or the like. The promotion setting terminal 5 is a terminal device such as a personal computer (PC), and transmits additional information to the electronic receipt managing server 4 through the network N4. Here, the network N4 is an exclusive line such as the Internet, a VPN, or the like, for example. In addition, a method of transmitting the additional information is not particularly limited, and the transmission may be performed using a general-purpose protocol such as HTTP, HTTPS, or the like.

The mobile terminal 7 is, for example, a terminal device such as a smart phone, a mobile phone, a personal digital assistant (PDA), and a tablet computer which is used by a user (customer) of the system. The mobile terminal 7 is provided with an application such as a web browser mounted therein for displaying various pieces of information which are provided on the network N5. In addition, a terminal device such as a PC may be used instead of the mobile terminal 7.

The mobile terminal 7 performs a request for a membership registration in the system by accessing the electronic receipt managing server 4 through the network N5. Here, the network N5 is the Internet, or a public network of various types.

Meanwhile, the membership registration of a customer in the system is performed, for example, according to the following order. A customer sends a blank mail to the electronic receipt managing server 4 through the network N5 from the mobile terminal 7. The electronic receipt managing server 4 sends a Uniform Resource Locator (URL) of a page for a membership registration to the received mail address. The mobile terminal 7 displays an input screen for inputting information necessary for the membership registration (name, destination information, or the like) when the customer selects the URL of the page for the membership registration displayed on the mobile terminal 7. After the necessary information is input by the customer, the electronic receipt managing server 4 executes the membership registration with respect to the member master. Thereafter, the electronic receipt managing server 4 delivers a membership registration completion mail including a membership code (customer code) and a password with respect to the mobile terminal 7. In this manner, the membership registration is ended.

Figure 2:
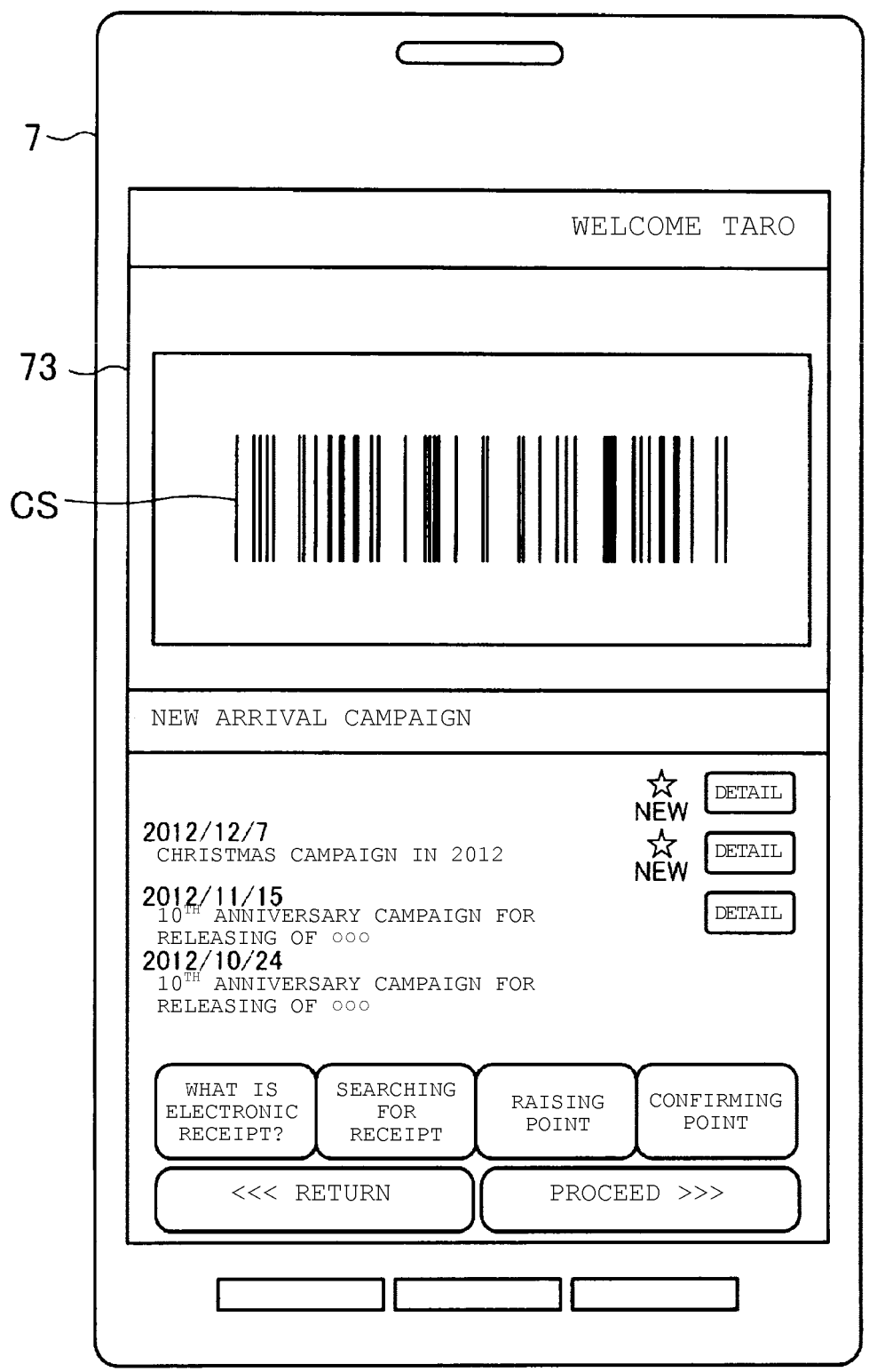
FIG. 2 illustrates an example of a screen of a mobile terminal displaying a code symbol corresponding to a member code of a customer.

After the above described membership registration, as illustrated in FIG. 2, the mobile terminal 7 displays a code symbol CS, such as a barcode or a two-dimensional code, corresponding to the membership code of the customer on a display unit 73. The customer presents the code symbol CS which is displayed on the mobile terminal 7 to a salesclerk when settling a transaction in the store P1. The salesclerk operates a code scanner 15 (shown in FIG. 3) which is connected to the POS terminal 1 to read the code symbol CS which is displayed on the mobile terminal 7. In this manner, it is possible to associate a membership code of a customer with receipt data which is generated after settling due to the merchandise sales data processing in the POS terminal 1.

In addition, the mobile terminal 7 receives an electronic receipt of the transaction which is transmitted from the electronic receipt managing server 4 through the network N5, after the settling (transaction) by the POS terminal 1. After a request for electronic receipt designating a membership code is transmitted to the electronic receipt managing server 4 through the network N5, the mobile terminal 7 receives the electronic receipt of the member from the electronic receipt managing server 4. In addition, the mobile terminal 7 displays the received electronic receipt on the display unit 73 which will be described below (refer to FIG. 17).

Figure 17:
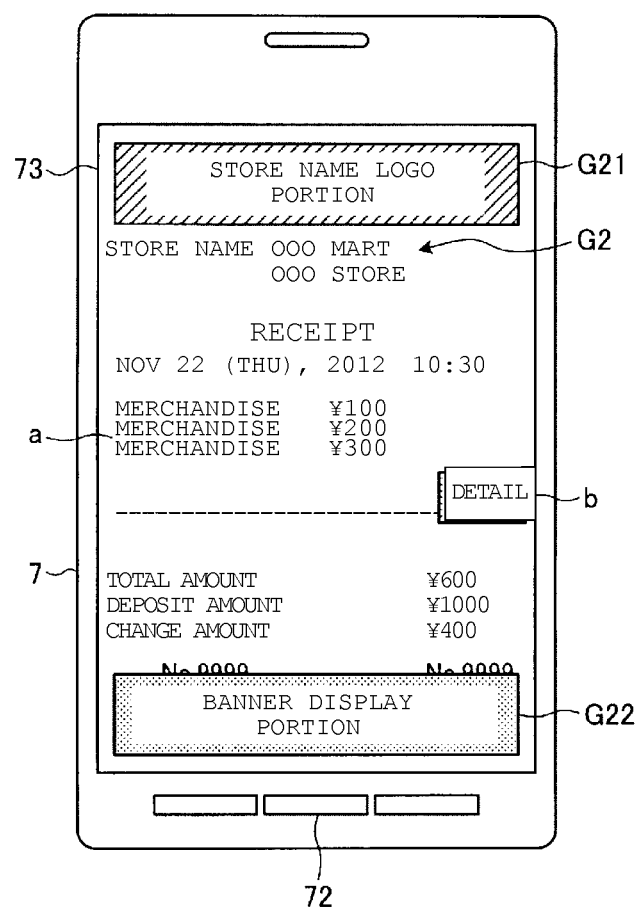
FIG. 17 illustrates an example of the electronic receipt which is displayed on the display unit of the mobile terminal.

In addition, when additional information is correlated with the received electronic receipt, the mobile terminal 7 displays an icon of campaign information based on the additional information (refer to FIG. 17). For example, it is possible to set a hyper link to a connection destination (URL, or the like) of the campaign information (for example, a promotion managing server 6) in the icon. In this case, when receiving a request for an operation of the icon, the mobile terminal 7 accesses the promotion managing server 6 through the network N5, and displays the campaign information.

The promotion managing server 6 is a server device which is accessed by the mobile terminal 7 connected through the network N5. The promotion managing server 6 includes an entry master which manages an access history of each type of campaign in correlation with a membership code for identifying each member. When receiving an access from the mobile terminal 7 to the campaign through the network N5, the promotion managing server 6 manages the access history of each type of campaign in correlation with a membership code. In addition, when accessing the promotion managing server 6, the mobile terminal 7 transmits a membership code related to a user (member) of the own terminal which is included in the receipt data, or the like.

In the electronic receipt system with the configuration, an electronic receipt (receipt data) denoting transaction (settlement) contents which are generated by performing the merchandise sales data processing in the POS terminal 1 of the store P1 is transmitted to the electronic receipt managing server 4 through the electronic receipt server 3, and is published on the website. Accordingly, the mobile terminal 7 which is provided with a web browser embedded therein may display the receipt data which is published on the website by downloading the data to the mobile terminal 7 by accessing the to the website using a Uniform Resource Locator (URL). In addition, the receipt data may be displayed with another application for displaying the receipt data on the mobile terminal 7.

Subsequently, a specific configuration of devices which make up the electronic receipt system according to the embodiment will be described.

Figure 3:
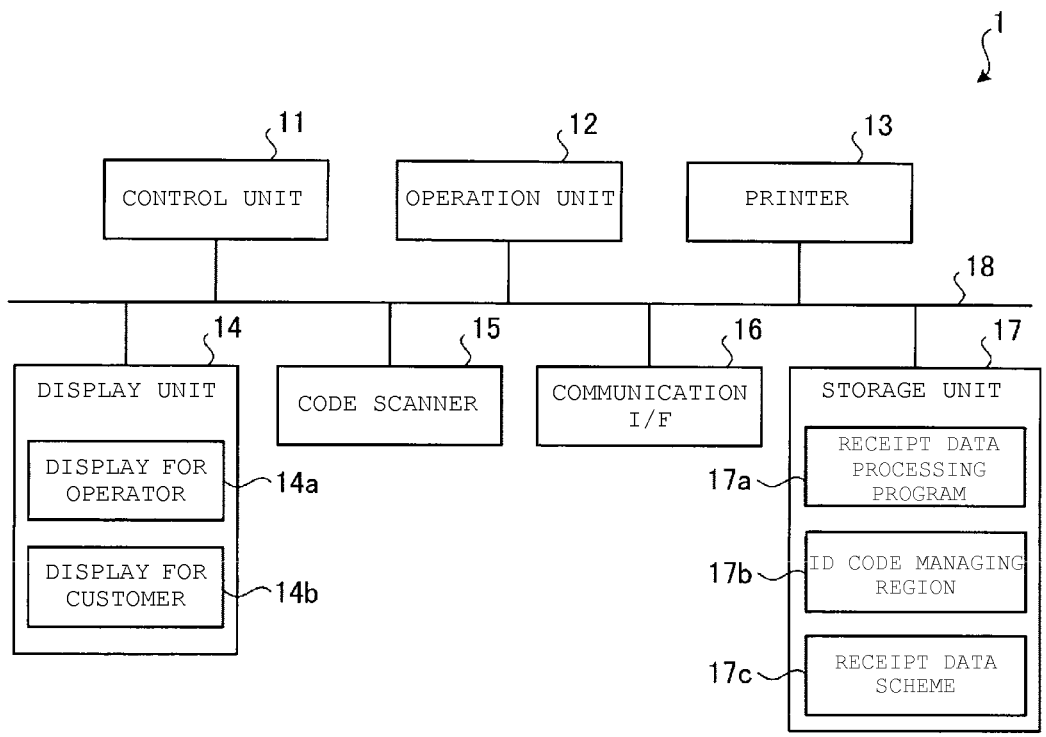
FIG. 3 is a block diagram of functional units of a POS terminal.

First, the POS terminal 1, which is a merchandise sales data processing device, will be described. FIG. 3 is a block diagram which illustrates a configuration of the POS terminal 1.

As illustrated in FIG. 3, the POS terminal 1 includes a control unit 11 which performs various arithmetic calculations and integrally controls each unit of the POS terminal 1. The control unit 11 is a computer which includes a Central Processing Unit (CPU), a Read Only Memory (ROM) which stores various programs or pieces of data, a Random Access Memory (RAM) which temporarily stores various programs, or stores various pieces of data in a freely rewritable manner, a Real Time Clock (RTC) unit for clocking current date and time, and the like.

The control unit 11 is connected to an operation unit 12, a printer 13, a display unit 14, and a code scanner 15 through a bus 18.

The operation unit 12 includes various keys with which an operator performs an operation input. As the operation keys, for example, there are a numeric key for inputting numerical values, a cursor key, or a selection and determination key for selecting a predetermined item, a subtotal key which commands an output of a total purchase price of merchandise of which a sales registration in a transaction is performed, a settlement key for declaring a settlement of the purchase by performing a settlement processing of one transaction, and the like.

The printer 13 is a printing unit for performing printing of a receipt, a journal, or the like. The printer 13 includes a cutting mechanism (not shown) which cuts a sheet such as rolled paper as a printing target, and cuts the sheet according to a cut command which will be described below.

The display unit 14 is, for example, a liquid crystal display, or the like, and displays various pieces of information such as a name of merchandise which is registered for sales, a price, a total amount of one transaction of which a settlement is declared, and a change sum. The display unit 14 includes a display for operator 14a which displays various pieces of information toward a cashier, and a display for customer 14b which displays various pieces of information toward a customer. In addition, the display unit 14 may be configured of a touch panel, and in this case, the touch panel functions as the operation unit 12.

The code scanner 15 is a scanning unit which optically reads a code symbol such as a barcode or a two-dimensional code. The code scanner 15 reads, for example, a code symbol which is attached to merchandise, a code symbol which is displayed on the mobile terminal 7, or the like, and outputs information which is associated with the code symbol to the control unit 11. In addition, with the code symbol which is attached to the merchandise, it is assumed that a merchandise code for specifying the merchandise, or the like, is associated. In addition, as the code symbol which is displayed on the mobile terminal 7, it is assumed that a membership code (customer code) for specifying a customer carrying the mobile terminal 7, or the like, is associated.

In addition, the control unit 11 is connected to a communication interface (I/F) 16 through the bus 18, and may be connected to the in-store network N1 or the network N2 through the communication interface (I/F) 16.

In addition, the control unit 11 is connected to the storage unit 17 through the bus 18. The storage unit 17 is, for example, an auxiliary storage unit such as a Hard Disk Drive (HDD), or a Solid State Drive (SSD). The storage unit 17 stores a program for executing various POS business including merchandise sales data processing. In addition, the storage unit 17 stores various data files related to merchandise sales data processing, such as a merchandise data file which includes merchandise data such as a merchandise name, a merchandise code, and a unit price of each merchandise. In addition, the storage unit 17 stores a receipt data processing program 17a for performing merchandise sales data processing or processing related to receipt data.

In addition, the storage unit 17 stores a POS number for distinguishing the own POS terminal 1 from another POS terminal 1, a company code (identification code of company which operates a store), business type and business category codes, a store code denoting the store P1 at which the POS terminal 1 is provided, and the like, in an identification code managing region 17b. Here, the business type and business category codes are codes for distinguishing a business type and a business category of a store (classification code), for example, a convenience store, a supermarket, a department store, a pharmacy, a restaurant, an eating house, or the like. In addition, such business type and business category codes may be arbitrarily selected according to a preference of a user. In addition, the company code (identification code of company which operates a store), and the business type and business category codes may be registered in the electronic receipt server 3.

In addition, the storage unit 17 stores a receipt data schema 17c in which a conversion rule for converting non-structured receipt data into structured receipt data (hereinafter, referred to as electronic receipt) is described.

Figure 4:
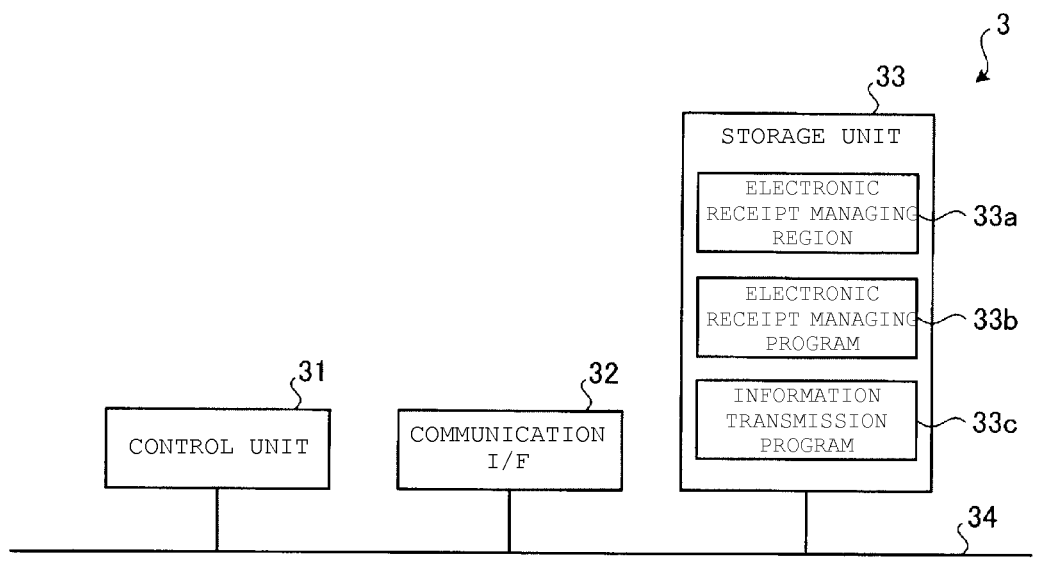
FIG. 4 is a block diagram of functional units of an electronic receipt server.

Subsequently, a configuration of the electronic receipt server 3 which functions as a receipt managing server for companies will be described using a block diagram in FIG. 4. The electronic receipt server 3 includes a control unit 31 which carries out various arithmetic calculations and integrally controls each unit of the electronic receipt server 3. The control unit 31 is a computer which includes a CPU, a ROM which stores various programs or pieces of data, a RAM which temporarily stores various programs, or stores various pieces of data in a freely rewritable manner, an RTC unit which clocks a current date and time, and the like.

The control unit 31 may be connected to the network N2 or the network N3 through a communication I/F 32 which is connected to a bus 34. In addition, the control unit 31 is connected to a storage unit 33 through the bus 34.

The storage unit 33 stores electronic receipts of a company which operates one or more stores in an electronic receipt managing region 33a. The electronic receipt includes a company code (identification code of company which operates a store), business type and business category codes, its store code, a membership code of a shopper, a POS number of a POS terminal 1, a receipt number, merchandise sales data, or the like.

In addition, the storage unit 33 stores an electronic receipt managing program 33b for managing the electronic receipt in the electronic receipt managing region 33a. In addition, the storage unit 33 stores an information transmission program 33c for transmitting receipt data which is managed in the electronic receipt managing region 33a to the electronic receipt managing server 4.

Figure 5:
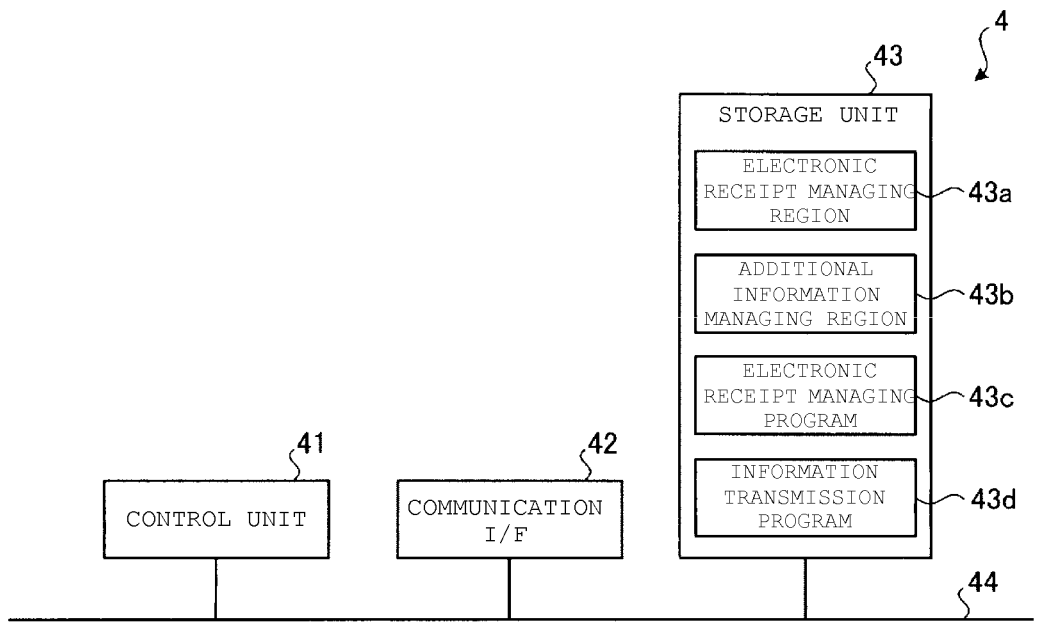
FIG. 5 is a block diagram of functional units of an electronic receipt managing server.

Subsequently, a configuration of the electronic receipt managing server 4, which functions as a receipt managing server for customers, will be described using a block diagram in FIG. 5. As illustrated in FIG. 5, the electronic receipt managing server 4 includes a control unit 41 which carried out various arithmetic calculations and integrally controls each unit of the electronic receipt managing server 4. The control unit 41 is a computer which includes a CPU, a ROM which stores various programs or pieces of data, a RAM which temporarily stores various programs, or stores various pieces of data in a freely rewritable manner, an RTC unit which clocks a current date and time, and the like.

The control unit 41 may connect to the networks N3, N4, and N5 through a communication I/F 42 which is connected to a bus 44. In addition, the control unit 41 is connected to a storage unit 43 through the bus 44.

The storage unit 43 has the electronic receipt managing region 43a for collectively storing electronic receipts of various companies which operate stores, in addition to a member master managing region (not shown) for storing and managing a member master. More specifically, the electronic receipt managing region 43a manages electronic receipts of various companies which manage stores for each member (customer).

The electronic receipt includes a membership code, a company code (identification code of company which operates a store), a store code, a POS number of a POS terminal 1, a receipt number, merchandise sales data (including date and time data), or the like. Accordingly, for example, a consumer goods manufacturer, or the like, may obtain unique information of purchased merchandise which is related to the manufacturer from the stored electronic receipts that satisfy specific conditions (for example, specific company which operates a store, specific region, specific time, or the like). In addition, the consumer goods manufacturer is, for example, a manufacturer of food, drink, clothing, cosmetics, medicines, household goods, or the like.

In addition, the storage unit 43 stores various pieces of additional information in the additional information managing region 43b in correlation with a desired merchandise (merchandise code), a member (membership code), a company (company code), and a store (store code). Here, the additional information is promotion information related to a promotion program, or the like, which is related to, for example, information on a desired merchandise and specific conditions (for example, specific company which operates a store, specific region, specific store, specific time, or the like). The additional information includes access information such as a URL associated with a homepage related to the promotion program of a company, a URL associated with a homepage related to a commercial message of a company, a URL associated with a coupon of a company, or the like, for example.

In addition, the storage unit 43 stores the electronic receipt managing program 43c for managing an electronic receipt and additional information of each company in the electronic receipt managing region 43a and the additional information managing region 43b, in addition to a member managing program (not shown) for managing the member master in a member master region. In addition, the storage unit 43 stores an information transmission program 43d for transmitting an electronic receipt and additional information of a desired merchandise to the mobile terminal 7. In addition, the member master managing region, the electronic receipt managing region 43a, and the additional information managing region 43b correspond to the database DB, which is illustrated in FIG. 1.

Figure 6:
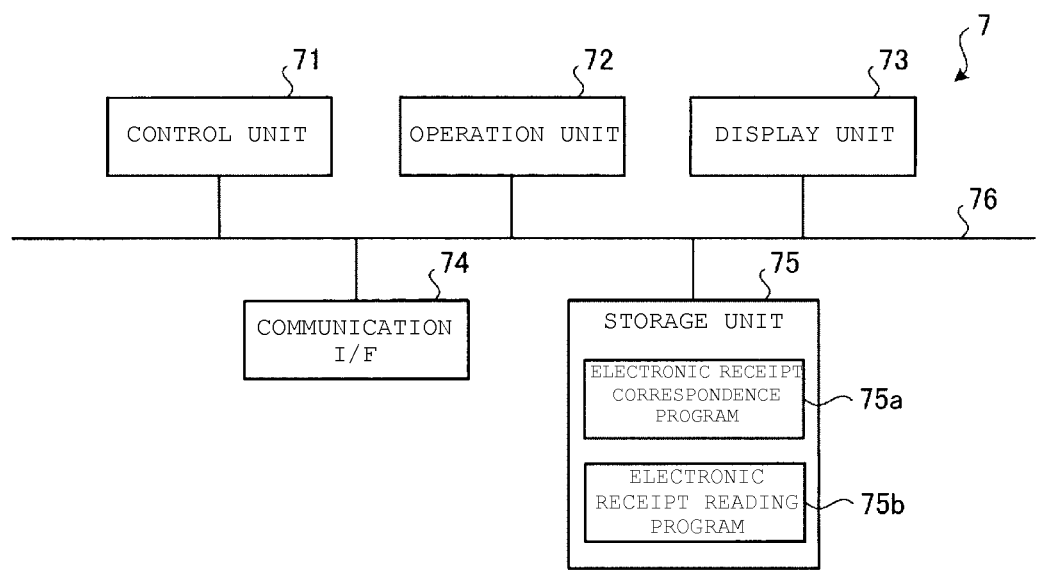
FIG. 6 is a block diagram of functional units of a mobile terminal.

Subsequently, a configuration of the mobile terminal 7 will be described using a block diagram in FIG. 6. As illustrated in FIG. 6, the mobile terminal 7 includes a control unit 71 which carries out various arithmetic calculations and integrally controls each unit of the mobile terminal 7. The control unit 71 is a computer which includes a CPU, a ROM which stores various programs or pieces of data, a RAM which temporarily stores various programs, or stores various pieces of data in a freely rewritable manner, an RTC unit which clocks a current date and time, and the like.

The control unit 71 is connected to an operation unit 72 and a display unit 73 through a bus 76. The operation unit 72 includes various operation keys with which a user (customer) performs an input operation, and a pointing device. The display unit 73 is, for example, a liquid crystal display, or the like, and displays various pieces of information such as an electronic receipt which will be described below. In addition, the display unit 73 may be configured of a touch panel, and in this case, the touch panel functions as the operation unit 72.

In addition, the control unit 71 is connected to a communication I/F 74 through the bus 76, and may be connected to the network N5 through the communication I/F 74. In addition, the control unit may be configured so as to be connected to the in-store network N1 through the communication I/F 74.

In addition, the control unit 71 is connected to a storage unit 75 through the bus 76. The storage unit 75 stores an electronic receipt correspondence program 75*a* for receiving an electronic receipt from the electronic receipt managing server 4, and an electronic receipt reading program 75*b* for reading the received receipt data, in addition to a web browser for reading various pieces of information (contents) which are published on a website.

Subsequently, operations of each unit which configures the system according to the embodiment will be described.

First, electronic receipt processing which is executed when the control unit 11 of the POS terminal 1 is operated according to the receipt data processing program 17*a* will be described with reference to FIGS. 7 to 11.

Figures 7, 8:
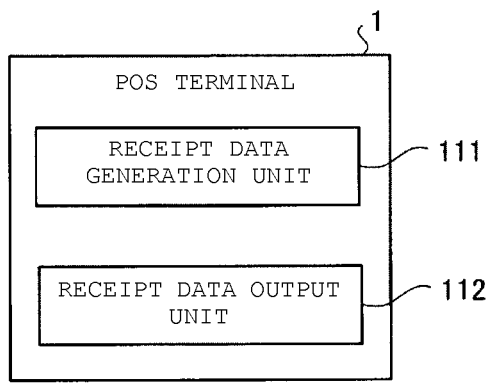
FIG. 7 is a functional block diagram when processing the electronic receipt in the POS terminal.
FIG. 8 is a diagram which schematically illustrates an example of non-structured receipt data.

As illustrated in FIG. 7, when the control unit 11 executes the receipt data processing program 17*a* a receipt data generation unit 111 which functions as a receipt data generation unit and a customer code obtaining unit, and a receipt data output unit 112 which functions as an output unit and a conversion unit are generated. As real hardware, when the CPU of the control unit 11 reads the receipt data processing program 17*a* from the storage unit 17, and executes the program, the above described each unit is downloaded to the RAM, and the receipt data generation unit 111 and the receipt data output unit 112 are generated in the RAM.

Here, the receipt data generation unit 111 is a functional unit corresponding to an existing application which mainly performs merchandise sales data processing and generates data for printing (receipt data) of a receipt. When obtaining a merchandise code specifying merchandise through the code scanner 15, the receipt data generation unit 111 reads merchandise data corresponding to the merchandise code from a merchandise data file, and executes merchandise sales data processing for calculating a settlement amount based on a unit price which is included in the merchandise data. In addition, the receipt data generation unit 111 generates merchandise sales data which is processed when executing the merchandise sales data processing, that is, receipt data including transaction contents of the merchandise.

In addition, when obtaining a membership code which specifies a customer through the code scanner 15 at any of timings during one transaction, the receipt data generation unit 111 generates receipt data including the membership code.

FIG. 8 is a diagram which schematically illustrates an example of receipt data. Here, the receipt data is non-structured text data, or the like, and is used in a printing by the printer 13. As illustrated in FIG. 8, the receipt data includes elements of the above described merchandise sales data D1 and a membership code D2. Here, the merchandise sales data D1 includes a merchandise name (merchandise code) of merchandise as a settlement target, an amount of money thereof, a total amount of all merchandises, a deposit amount which is paid by a customer, a change amount, or the like.

In addition, the receipt data includes elements of a company code (company name) D3 denoting a company which operates a store, a store code (store name) D4, a telephone number of a store D5, an address D6, a transaction date and time D7, a transaction number (receipt number) D8, a register number D9, a name of a person in charge D10, and the like. In addition, elements which are included in the receipt data are not limited to the example shown in FIG. 8, other elements such as business type and business category codes may be included, and elements such as the telephone number D5, the address D6, or the like, may be excluded.

In addition, when the settlement key is pressed down, the receipt data generation unit 111 determines that merchandise sales data processing of one transaction is completed, and outputs (issues) generated receipt data to the receipt data output unit 112 along with a cut command. Here, the cut command is one of generally-used control commands for a printer, and is command information for commanding cutting of a sheet on which an image corresponding to the receipt data is printed. In addition, the receipt data may be collectively generated along with pressing of the settlement key, or may be sequentially generated, every time a merchandise code or a customer code is obtained.

The receipt data output unit 112 determines an output destination of the receipt data every time receipt data of one transaction is generated by the receipt data generation unit 111. More specifically, when the cut command is issued by the receipt data generation unit 111, the receipt data output unit 112 determines that receipt data of one transaction is generated. In addition, the receipt data output unit 112 determines whether or not a membership code is included in the generated receipt data, and outputs the receipt data to an output destination which is determined according to a determination result thereof.

Specifically, when determining that a membership code is not included in the receipt data, the receipt data output unit 112 outputs the receipt data to the printer 13 along with the cut command. In this manner, the printer 13 prints out a paper receipt of one transaction by cutting a sheet thereof according to the cut command after printing the receipt data on the sheet. In addition, at a time of printing out, all of elements configuring the receipt data may be printed, a membership code, or the like, may be excluded, or printing may be performed in a state in which other information such as an advertisement, or the like, is added.

In addition, when determining that the membership code is included in the receipt data, the receipt data output unit 112 converts the receipt data into a predetermined data format according to the conversion rule of the receipt data schema 17*c*. In addition, the receipt data output unit 112 transmits (outputs) the receipt data of which the data format is converted, i.e., an electronic receipt, to the electronic receipt server 3 which is managed by the company corresponding to its company code.

Here, FIG. 9 is a diagram which schematically illustrates an example of an electronic receipt. As illustrated in FIG. 9, the electronic receipt includes structured data (structured document) such as data of XML or CSV format. FIG. 9 illustrates an example in which each element (D1 to D10) of the receipt data illustrated in FIG. 8 is converted into an XML format.

A conversion of receipt data into an electronic receipt is performed based on the conversion rule which is described in the receipt data schema 17*c*. Specifically, in the receipt data schema 17*c*, predetermined elements configuring the receipt data, and attribute information (tag, or the like) denoting an attribute of each element are defined. The receipt data output unit 112 generates a structured electronic receipt as illustrated in FIG. 9 by causing each element of the receipt data to be structured using corresponding attribute information. Since the elements which are included in the electronic receipt may be efficiently used by generating the structured electronic receipt in this manner, it is possible to obtain various advantages when managing data.

In this manner, the receipt data output unit 112 determines that receipt data of one transaction is generated when the cut command is issued by the receipt data generation unit 111, and starts an output of the receipt data. In this manner, since it is not necessary to transmit to the receipt data output unit 112 an additional signal for commanding an end of one transaction from the receipt data generation unit 111, the receipt data output unit 112 can perform the output of the receipt data of one transaction without a special change with respect to the receipt data generation unit 111 corresponding to an existing application. In addition, since a change of the receipt data generation unit 111 may be unnecessary, it is possible to execute an electronic receipt output function while using the existing application efficiently.

In addition, the receipt data output unit 112 determines the output destination of the receipt data depending on whether or not the membership code is included in the receipt data. In this manner, since an output of a paper receipt or an electronic receipt may be performed without preparing information on whether or not the paper receipt is necessary with respect to each customer, it is possible to efficiently determine the output destination of the receipt data. In addition, for example, since a customer (member) may select an output of the paper receipt or the electronic receipt by inputting or not inputting the membership code in each transaction, it is possible to improve convenience of the customer.

In addition, when outputting the receipt data to the electronic receipt server 3, the receipt data output unit 112 converts the receipt data into an electronic receipt in which the elements which are included in the receipt data are structured, and outputs the electronic receipt. In this manner, since the elements which are included in the electronic receipt may be efficiently used, it is possible to improve convenience of the electronic receipt in the electronic receipt server 3 and the electronic receipt managing server 4 which manage the electronic receipt, or in the mobile terminal 7 which performs a display of the electronic receipt.

FIG. 10 is a flowchart which illustrates a flow of a process of the electronic receipt in the POS terminal 1. First, the receipt data generation unit 111 of the POS terminal 1 determines whether or not a code symbol (merchandise code) which is attached to merchandise, or a code symbol (membership code) which is displayed on the mobile terminal 7 is read by the code scanner 15 (Step S11). When the code symbol is not read (No in Step S11), the receipt data generation unit 111 proceeds to Step S16.

On the other hand, when it is determined that the code symbol is read (Yes in Step S11), the receipt data generation unit 111 determines whether information which is obtained through the reading is a merchandise code or a membership code (Step S12).

When it is determined that the merchandise code is obtained in Step S12 (Step S12; merchandise code), the receipt data generation unit 111 executes merchandise sales data processing for calculating a settlement amount, based on a unit price which is included in merchandise data, when the merchandise data is read from a merchandise data file with respect to merchandise which is specified by the merchandise code (Step S13). Subsequently, the receipt data generation unit 111 generates receipt data including merchandise sales data which is processed when performing the merchandise sales data processing (Step S14).

In addition, when it is determined that the membership code is obtained in Step S12 (Step S12; membership code), the receipt data generation unit 111 generates receipt data including the membership code (Step S15).

Here, in order to input the membership code to the POS terminal 1, for example, a customer displays a code symbol including a membership code, or the like, on the display unit 73 of the mobile terminal 7, and a salesclerk or the customer reads the code symbol using the code scanner 15 of the POS terminal 1. In addition, the receipt data generation unit 111 may have a configuration in which an exclusive process, or the like, in which a membership code which is input during one transaction becomes the only code is performed.

In subsequent Step S16, the receipt data generation unit 111 determines whether or not a start of a settlement processing is commanded by the pressing down of the settlement key or the like (Step S16). When the start of the settlement processing is not commanded (No in Step S16), the process returns to Step S11. When the start of the settlement processing is commanded (Yes in Step S16), the receipt data generation unit 111 issues (outputs) a cut command to the receipt data output unit 112 (Step S17).

When receiving the cut command from the receipt data generation unit 111, the receipt data output unit 112 determines that receipt data of one transaction is generated, and determines whether or not a membership code is included in the receipt data (Step S18).

When a membership code is not included in the receipt data (No in Step S18), the receipt data output unit 112 performs printing out of the receipt data by outputting the receipt data of one transaction along with the cut command to the printer 13 (Step S19), and the process is ended. In this manner, the printer 13 performs printing out of a paper receipt of one transaction by cutting a sheet according to the cut command after printing the receipt data on the sheet.

On the other hand, when the membership code is included in the receipt data (Yes in Step S18), the receipt data output unit 112 generates an electronic receipt by converting a data format of the non-structured receipt data into structured format (Step S20). In addition, the receipt data output unit 112 transmits the electronic receipt which is generated through the communication I/F 16 to the electronic receipt server 3 (Step S21), and the process is ended.

In addition, in the above described processing, when the membership code is included in the receipt data, the receipt data is output to the electronic receipt server 3. However, it is not limited to this, and the receipt data may be output to both the printer 13 and the electronic receipt server 3.

In addition, an output destination of the receipt data may be selected when the membership code is included in the receipt data. For example, the mobile terminal 7 may cause the code symbol CS which will be displayed to include output classification information for designating an output destination of the receipt data, and the output destination can be determined based on the output classification information. In this case, the receipt data generation unit 111 includes the output classification information, which is read by the code scanner 15, in the receipt data along with the membership code. In addition, when it is determined that the membership code is included in the receipt data and that the output classification information is present, the receipt data output unit 112 determines an output destination of the receipt data based on the output classification information. In addition, it is possible to designate anyone of the printer 13 and the electronic receipt server 3, or both of the printer 13 and the server 3 in the output classification information.

In addition, an output destination of receipt data may be selected every time a settlement of merchandise is made. In this case, for example, when it is determined that a membership code is included in receipt data, the receipt data output unit 112 displays an output destination selection screen for selecting an output destination of the receipt data on the display unit 14.

Figure 11:
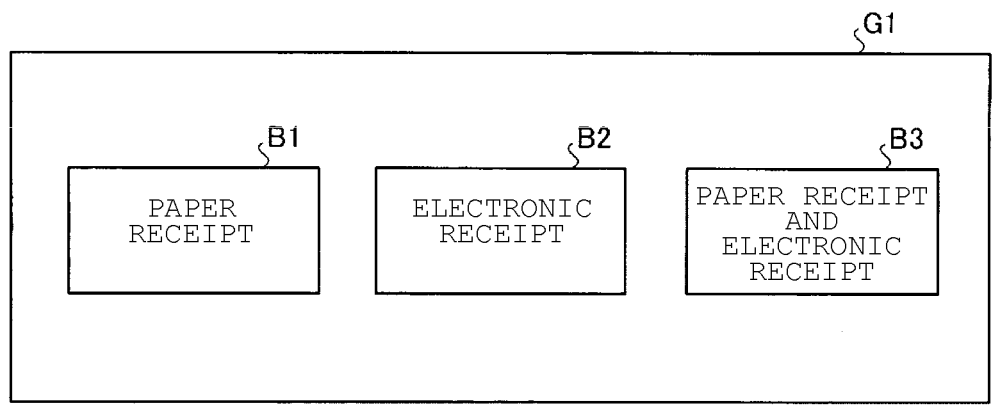
FIG. 11 is a diagram which illustrates examples of output destination selection screens which are displayed on a display unit of the POS terminal.

Here, FIG. 11 is a diagram which illustrates an example of an output destination selection screen G1 which is displayed on the display unit 14. As illustrated in FIG. 11, the output destination selection screen G1 includes a first button B1 which designates the printer 13, a second button B2 which designates the electronic receipt server 3, and a third button B3 which designates both the printer 13 and the electronic receipt server 3 as operational buttons which designate an output destination of receipt data. When using the output destination selection screen G1, an operator of the POS terminal 1 asks a customer about an output destination of receipt data, and operates one of the buttons corresponding to the output destination selected by the customer. In addition, when receiving the operation of the operator, the receipt data output unit 112 outputs the receipt data to an output destination corresponding to the selected button.

In addition, a display of a selection screen is not limited to the display for operator 14a, and may be displayed on the display for customer 14b. In addition, when the display for customer 14b is configured of a touch panel, a customer himself may select an output destination.

In addition, a customer may confirm the output destination of the receipt data during the merchandise sales data processing, and in such a case, the receipt data generation unit 111 displays the output destination selection screen G1, or the like, on the display unit 14, and the output destination corresponding to an operated operator is included in the receipt data as output classification information. In addition, when the membership code and the output classification information are included in the receipt data, the receipt data output unit 112 determines the output destination of the receipt data based on the output classification information.

In this manner, when the membership code is included in the receipt data, the receipt data output unit 112 receives a selection of the output destination of the receipt data automatically or manually. In this manner, since a method of determining the output destination may be flexibly switched, it is possible to efficiently determine the output destination of the receipt data.

Figure 12:
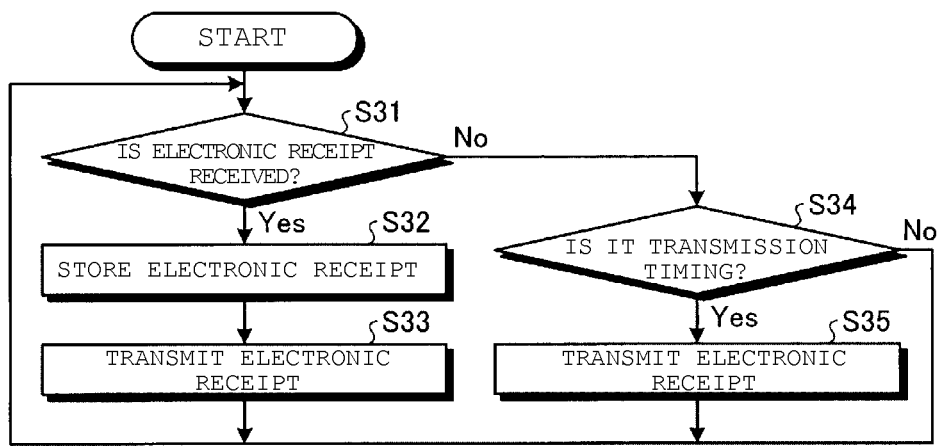
FIG. 12 is a flowchart of electronic receipt managing processing and information transmission processing carried out by the electronic receipt server.

Subsequently, a flow of electronic receipt managing processing which is executed when the control unit 31 of the electronic receipt server 3 is operated according to the electronic receipt managing program 33b, and a flow of information transmission processing which is executed when the control unit of the electronic receipt server is operated according to the information transmission program 33c will be described with reference to a flowchart illustrated in FIG. 12.

When receiving an electronic receipt which is transmitted from the POS terminal 1 through the communication I/F 32 (Yes in Step S31), the control unit 31 of the electronic receipt server 3 stores the electronic receipt of a company in the electronic receipt managing region 33a of the storage unit 33 (Step S32). In addition, the control unit 31 of the electronic receipt server 3 transmits the electronic receipt which is stored in Step S32 to the electronic receipt managing server 4 (Step S33), and the process returns to Step S31.

In addition, at a preset transmission timing (No in Step S31→Yes in Step S34), the control unit 31 of the electronic receipt server 3 transmits the electronic receipt which is stored and managed in the electronic receipt managing region 33a to the electronic receipt managing server 4 (Step S35), and the process returns to Step S31. By the transmission in Step S35, it is possible to transmit an electronic receipt which is omitted from transmission targets in Step S33, for example, to the electronic receipt managing server 4. In addition, in Step S35, a control of transmitting only a non-transmitted electronic receipt may be possible.

Subsequently, a flow of electronic receipt managing processing which is executed when the control unit 41 of the electronic receipt managing server 4 is operated according to the electronic receipt managing program 43c, and a flow of merchandise information transmission processing which is executed when the control unit of the electronic receipt managing server is operated according to the information transmission program 43d will be described with reference to a functional block diagram illustrated in FIG. 13, and a flowchart illustrated in FIG. 14.

Figure 13:
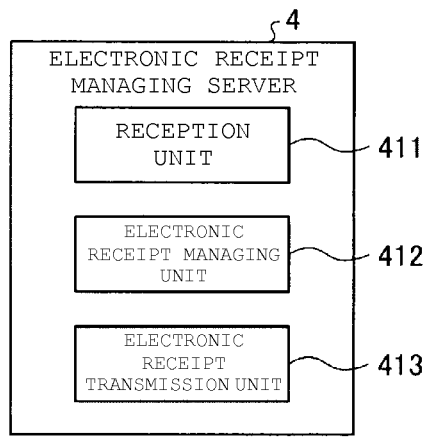
FIG. 13 is a functional block diagram related to the electronic receipt managing processing and merchandise information transmission processing carried out by the electronic receipt managing server.

As illustrated in FIG. 13, when the control unit 41 executes the electronic receipt managing program 43c and the information transmission program 43d, a module configuration including a reception unit 411 which functions as a reception unit, an electronic receipt managing unit 412, and an electronic receipt transmission unit 413 is generated. As real hardware, when the CPU of the control unit 41 reads out the electronic receipt managing program 43c and the information transmission program 43d from the storage unit 43, and executes the programs, each above described unit is loaded to the RAM, and the reception unit 411, the electronic receipt managing unit 412, and the electronic receipt transmission unit 413 are generated in the RAM.

The reception unit 411 includes a company code which denotes a company operating a store, and receives a receipt which is printed and issued at a time of merchandise sales data processing, or an electronic receipt on a company basis which is electronically processed instead of the receipt, from the electronic receipt server 3.

The electronic receipt managing unit 412 stores the electronic receipt on the company basis which is received by the reception unit 411 in the electronic receipt managing region 43a of the storage unit 43, and manages the electronic receipt. In addition, the electronic receipt managing unit 412 stores additional information such as promotion information related to a promotion program which is correlated with a desired merchandise and elements of specific conditions (for example, limiting to specific company which operates a store, limiting to specific region, limiting to specific time, or the like) in the additional information managing region 43b of the storage unit 43, and manages the additional information.

The electronic receipt transmission unit 413 obtains an electronic receipt which is correlated with the membership code, and includes one or more company codes from the electronic receipt managing region 43a, and transmits the electronic receipt to the mobile terminal 7 which is correlated with a membership code of a predetermined shopper. In addition, when additional information is correlated with the elements configuring the electronic receipt, the electronic receipt transmission unit 413 obtains the additional information from the additional information managing region 43b, and transmits the additional information to the mobile terminal along with the electronic receipt.

Figure 14:
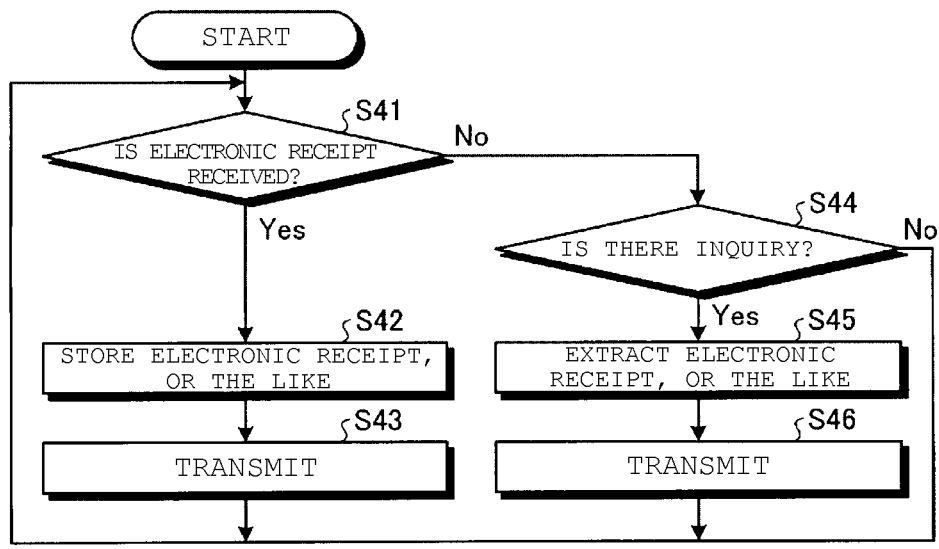
FIG. 14 is a flowchart of the electronic receipt managing processing and merchandise information transmission processing in the electronic receipt managing server.

As illustrated in FIG. 14, the reception unit 411 of the electronic receipt managing server 4 determines whether or not the electronic receipt which is transmitted from the electronic receipt server 3 in each company is received through the communication I/F 42 (Step S41).

When it is determined that the electronic receipt is received (Yes in Step S41), the electronic receipt managing unit 412 of the electronic receipt managing server 4 stores the electronic receipt of each company in the electronic receipt managing region 43a of the storage unit 43 (Step S42). Here, when there is additional information which is associated with elements of stored electronic receipt (merchandise code, membership code, company code, store code, or the like), the additional information is correlated with the elements. Subsequently, the electronic receipt transmission unit 413 transmits the electronic receipt which is stored in Step S42 to a transmission destination (mobile terminal 7) which is managed by being correlated with a membership code of the electronic receipt (Step S43), and the process returns to Step S41. In addition, in Step S43, when additional information is correlated with the electronic receipt, the additional information is also transmitted to the transmission destination.

In addition, when there is an inquiry of an electronic receipt from the mobile terminal 7 (No in Step S41→Yes in Step S44), the electronic receipt transmission unit 413 of the electronic receipt managing server 4 extracts an electronic receipt which is stored and managed in the electronic receipt managing region 43a according to contents of the inquiry of the electronic receipt (Step S45), and then transmits the electronic receipt to the mobile terminal 7 which made the inquiry (Step S46), and the process returns to Step S41. In addition, in Step S46, when additional information is correlated with the electronic receipt, the additional information is also transmitted to the mobile terminal 7 which made the inquiry.

Subsequently, a flow of electronic receipt reception processing which is executed when the control unit 71 of the mobile terminal 7 is operated according to an electronic receipt correspondence program 75a, and a flow of electronic receipt reading processing which is executed when the control unit of the mobile terminal is operated according to an electronic receipt reading program 75b will be described with reference to FIGS. 15 to 17.

Figure 15:
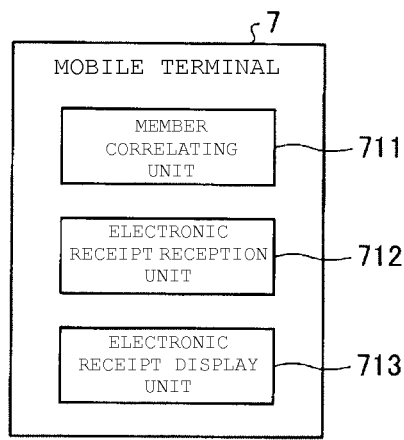
FIG. 15 is a functional block diagram related to electronic receipt reception processing and electronic receipt reading processing carried out by the mobile terminal.

As illustrated in FIG. 15, the control unit 71 executes the electronic receipt correspondence program 75a and the electronic receipt reading program 75b, a module configuration including a member correlating unit 711, an electronic receipt reception unit 712, and an electronic receipt display unit 713 is generated. As real hardware, when the CPU of the control unit 71 reads out the electronic receipt correspondence program 75a and the electronic receipt reading program 75b from the storage unit 75, and executes the programs, each above described unit is loaded to the RAM, and the member correlating unit 711, the electronic receipt reception unit 712, and the electronic receipt display unit 713 are generated in the RAM.

The member correlating unit 711 causes the mobile terminal 7 and a membership code of a predetermined shopper to be correlated with each other. The electronic receipt reception unit 712 receives an electronic receipt from the electronic receipt managing server 4. The electronic receipt display unit 713 causes the electronic receipt which is received by the electronic receipt reception unit 712 to be displayed on the display unit 73.

Figure 16:
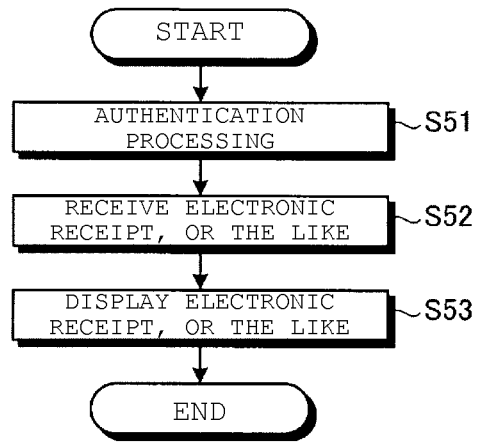
FIG. 16 is a flowchart of the electronic receipt reception processing and the electronic receipt reading processing carried out by the mobile terminal.

As illustrated in FIG. 16, first, the member correlating unit 711 of the mobile terminal 7 executes authentication processing by accessing the electronic receipt managing server 4 in response to input of a membership code and a password (Step S51). In this manner, the mobile terminal 7 and the membership code of the predetermined shopper are correlated with each other.

After the authentication, the electronic receipt reception unit 712 of the mobile terminal 7 receives an electronic receipt which is stored and managed in the electronic receipt managing region 43a of the electronic receipt managing server 4 by corresponding to the input membership code (Step S52). In addition, when additional information is correlated with the electronic receipt, the additional information is also received from the electronic receipt managing server 4. In addition, receipt data may be received through an email.

Subsequently, the electronic receipt display unit 713 of the mobile terminal 7 causes the electronic receipt, or the like, which is received by the electronic receipt reception unit 712 to be displayed on the display unit 73 (Step S53), and the process is ended.

FIG. 17 is a diagram which illustrates an example of an electronic receipt G2 which is displayed on the display unit 73 of the mobile terminal 7. The electronic receipt G2 is displayed with the same layout or contents as that of a receipt which is printed on a sheet. In addition, in the electronic receipt G2, it is possible to focus on merchandise "a", or the like, denoting a transaction merchandise, using a cursor which is subject to an input of the operation unit 72. In addition, FIG. 17 shows an example in which a store name logo portion G21 at which a logo of a store name is displayed, and a banner display portion G22 at which an advertisement, or the like, is displayed are provided in the electronic receipt G2.

In addition, a display format of receipt data does not necessarily match an image of a receipt which is printed on a sheet. However, the receipt data substitutes for a paper receipt, and is electronic merchandise purchase certification information which certificates purchasing of merchandise. Therefore, since the receipt data is used in a case of being presented as the merchandise purchase certification information in FIG. 17, an example in which the following information is displayed is illustrated.

store name
purchase date and time
specification of purchased merchandise
total sales amount
deposit amount
change amount
register number
transaction number Here, when a URL (access information) of the promotion managing server 6, or the like, is set as additional information of any of the merchandise "a", the hyperlink is embedded in a corresponding merchandise name, or an icon b, or the like, as an operator for commanding access to the URL is displayed.

For example, when the access destination which is denoted by the URL is a server device which receives an access to a predetermined campaign (for example, promotion managing server 6), the control unit 71 of the mobile terminal 7 accesses the promotion managing server 6 according to pressing down of the icon b, or the like, and displays information of the campaign. A membership code of own apparatus which is included in receipt data, or the like, may be transmitted when accessing an access destination. In addition, in the promotion managing server 6, an access history in each type of campaign is managed by being correlated with a membership code for identifying each member.

In addition, when receiving a plurality of pieces of receipt data, a selection screen from which each piece of receipt data may be selected based on a purchase date, a company code, or the like, which is included in the receipt data may be displayed. In this case, the electronic receipt display unit 713 causes receipt data which is selected from the selection screen to be displayed on the display unit 73.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, according to the embodiment, a membership code, or the like, is obtained by the code scanner 15. However, it is not limited to this, and the membership code, or the like, may be obtained using other methods. Specifically, a membership code, or the like, may be transmitted and received through a short range wireless communication with a short range wireless communication unit such as a Near Field Communication (NFC), Bluetooth (registered trademark), or the like, in the POS terminal 1 and the mobile terminal 7. In this case, the mobile terminal 7 is assumed to maintain a membership code, or the like, in the storage unit 75, an IC tag (not shown), or the like.

In addition, according to the embodiment, a membership code, or the like, is obtained from the mobile terminal 7. However, it is not limited to this, and the membership code, or the like, may be obtained from a medium such as an IC card, a magnetic card, or the like, which may include the membership code. In addition, when using the IC card, the POS terminal 1 is assumed to include a reading-writing unit such as an IC card reader-writer. In addition, when using the magnetic card, the POS terminal 1 is assumed to include a card reader, a card writer, or the like, for the magnetic card.

In addition, according to the embodiment, the electronic receipt server 3 is provided at the head office P2. However, it is not limited to this, and the electronic receipt server 3 for a store may be provided in the store P1. In this case, the POS terminal 1 outputs an electronic receipt to the electronic receipt server 3 which is connected to the in-store network N1 of the store, and the electronic receipt server 3 transmits the electronic receipt to the electronic receipt managing server 4 through the in-store network N1 and the network N2.

In addition, according to the embodiment, an electronic receipt which is generated in the POS terminal 1 is output to the electronic receipt managing server 4 through the electronic receipt server 3. However, it is not limited to this, and the electronic receipt may be directly output to the electronic receipt managing server 4 by accessing the electronic receipt managing server 4 through the network N3 from the POS terminal 1.

In addition, according to the embodiment, the mobile terminal 7 receives an electronic receipt through the electronic receipt managing server 4. However, it is not limited to this, and the electronic receipt may be directly received from the POS terminal 1. In this case, the POS terminal 1 outputs a generated electronic receipt to the mobile terminal 7 which is connected through the in-store network N1 or a short range wireless communication unit (not shown). In addition, in this case, authentication processing may be performed in the POS terminal 1.

In addition, according to the embodiment, the merchandise data file is stored in the POS terminal 1. However, it is not limited to this, and the store server 2 may store the merchandise data file so that the file may be referred to from the POS terminal 1.

What is claimed is:

1. A receipt processing device comprising:
   a printer configured to print a receipt;
   an output section configured to receive receipt data in a first data format including information about an item purchased by a customer and also a customer code in case the customer code is obtained, determine whether or not the receipt data in the first data format includes the customer code, and select at least one of the printer and an external device that is external to the receipt processing device, as an output destination, based on the determination; and
   a converting section configured to convert a data format of the receipt data from the first data format to a second data format that is different from the first data format, wherein
   the output section is further configured to output the receipt data in the first data format if the printer is selected as the output destination and in the second data format if the external device is selected as the output destination.

2. The receipt processing device according to claim 1, wherein
   the first data format is an unstructured data format, and the second data format is a structured data format.

3. The receipt processing device according to claim 2, wherein the second data format is XML format or CSV format.

4. The receipt processing device according to claim 1, wherein
   the output section selects the printer as the output destination when the receipt data does not include the customer code.

5. The receipt processing device according to claim 1, wherein
   the output section selects the external device as the output destination when the receipt data includes the customer code.

6. The receipt processing device according to claim 1, further comprising:
   a communication interface, wherein
   the output section outputs the receipt data in the second data format through the communication interface for transmission to the output destination over a computer network.

7. The receipt processing device according to claim 1, wherein
   the receipt printed by the printer based on the receipt data in the first data format includes an image portion substantially same as an image portion included in a receipt screen generated based on the receipt data in the second data format that is output to the external device.

8. A method for processing receipt data, comprising:
   receiving receipt data of a first data format including information about an item purchased by a customer and also a customer code in case the customer code is obtained;
   determining whether or not the received receipt data includes the customer code;
   selecting at least one of a printer and an external device that is different from the printer as an output destination, based on the determination;
   converting a data format of the receipt data from the first data format to a second data format that is different from the first data format when the receipt data is determined to include the customer code; and outputting the receipt data in the first data format if the printer is selected as the output destination, and in the second data format if the external device is selected as the output destination.

9. The method according to claim 8, wherein
the first data format is an unstructured data format, and the second data format is a structured data format.

10. The method according to claim 9, wherein the second data format is XML format or CSV format.

11. The method according to claim 8, wherein
the printer is selected as the output destination when the receipt data is determined to not include the customer code.

12. The method according to claim 8, wherein
the external device is selected as the output destination when the receipt data is determined to include the customer code.

13. The method according to claim 8, wherein
the receipt data in the second data format is output to the external device through a communication interface connected to a computer network.

14. The method according to claim 8, further comprising:
printing, by the printer, a receipt based on the receipt data in the first data format, if the printer is selected as the output destination; and
causing the receipt data in the second data format to be stored in the external device, such that a display device can display a receipt screen based on the receipt data of the second data format stored in the external device, if the external device is selected as the output destination.

15. The method according to claim 14, wherein
the receipt printed by the printer based on the receipt data in the first data format includes an image portion substantially same as an image portion included in the receipt screen displayed based on the receipt data of the second data format stored in the external device.

16. A non-transitory computer readable medium comprising a program that is executable in a receipt processing device to cause the receipt processing device to perform a method comprising:

receiving receipt data of a first data format including information about an item purchased by a customer and also a customer code in case the customer code is obtained;
determining whether or not the received receipt data includes the customer code;
selecting at least one of a printer and an external device that is different from the printer as an output destination, based on the determination;
converting a data format of the receipt data from the first data format to a second data format that is different from the first data format when the receipt data is determined to include the customer code; and
outputting the receipt data in the first data format if the printer is selected as the output destination, and in the second data format if the external device is selected as the output destination.

17. The non-transitory computer readable medium of claim 16, wherein
the first data format is an unstructured data format, and the second data format is a structured data format.

18. The non-transitory computer readable medium of claim 17, wherein the second data format is XML format or CSV format.

19. The non-transitory computer readable medium of claim 16, wherein
the external device is selected as the output destination when the receipt data is determined to include the customer code.

20. The non-transitory computer readable medium of claim 16, wherein the method further comprises:
printing, by the printer, a receipt based on the receipt data in the first data format, if the printer is selected as the output destination; and
causing the receipt data in the second data format to be stored in the external device, such that a display device can display a receipt screen based on the receipt data of the second data format stored in the external device, if the external device is selected as the output destination.

* * * * *